INVENTORS
Heinrich Degenhardt
Werner Quaas

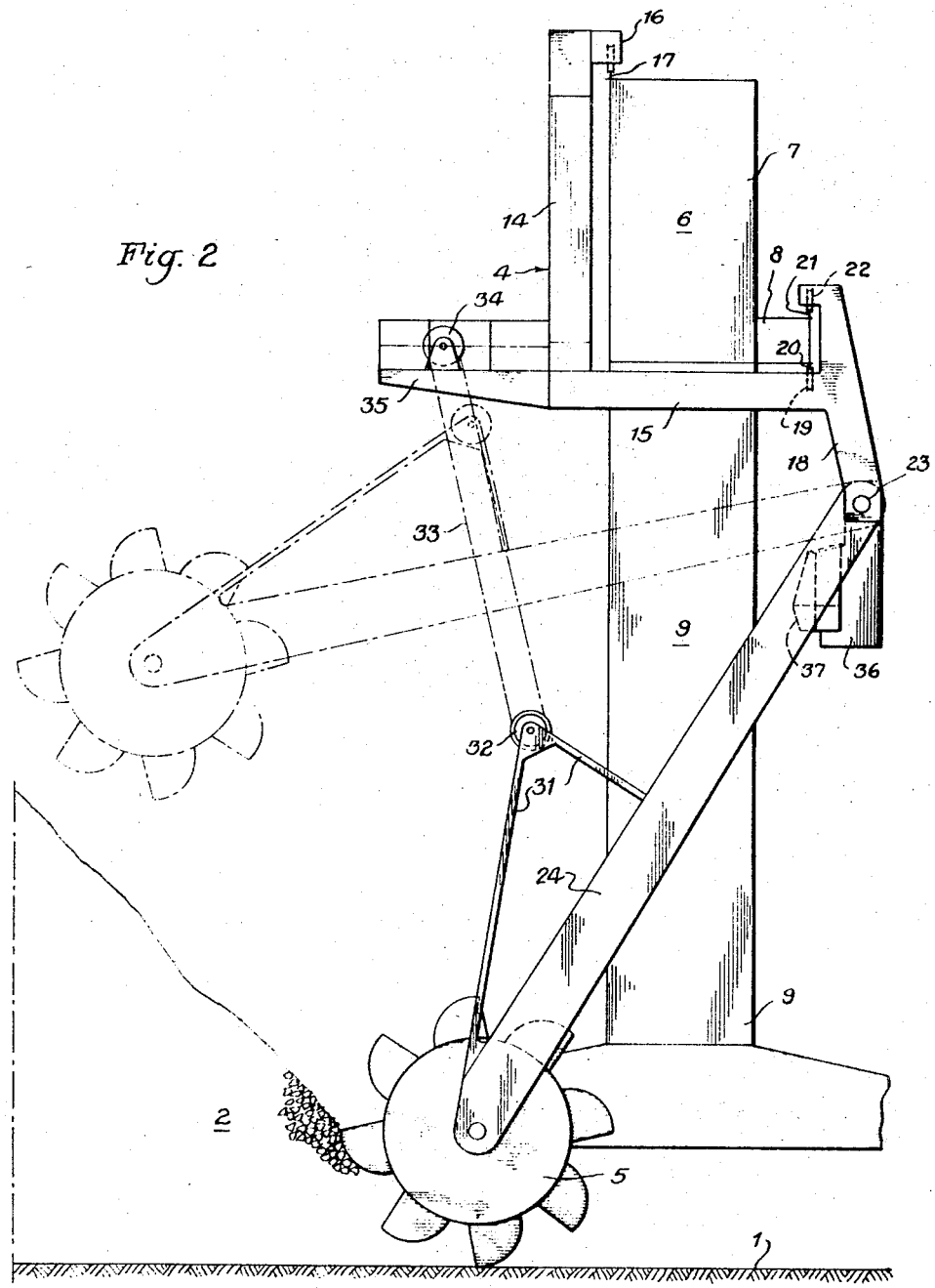

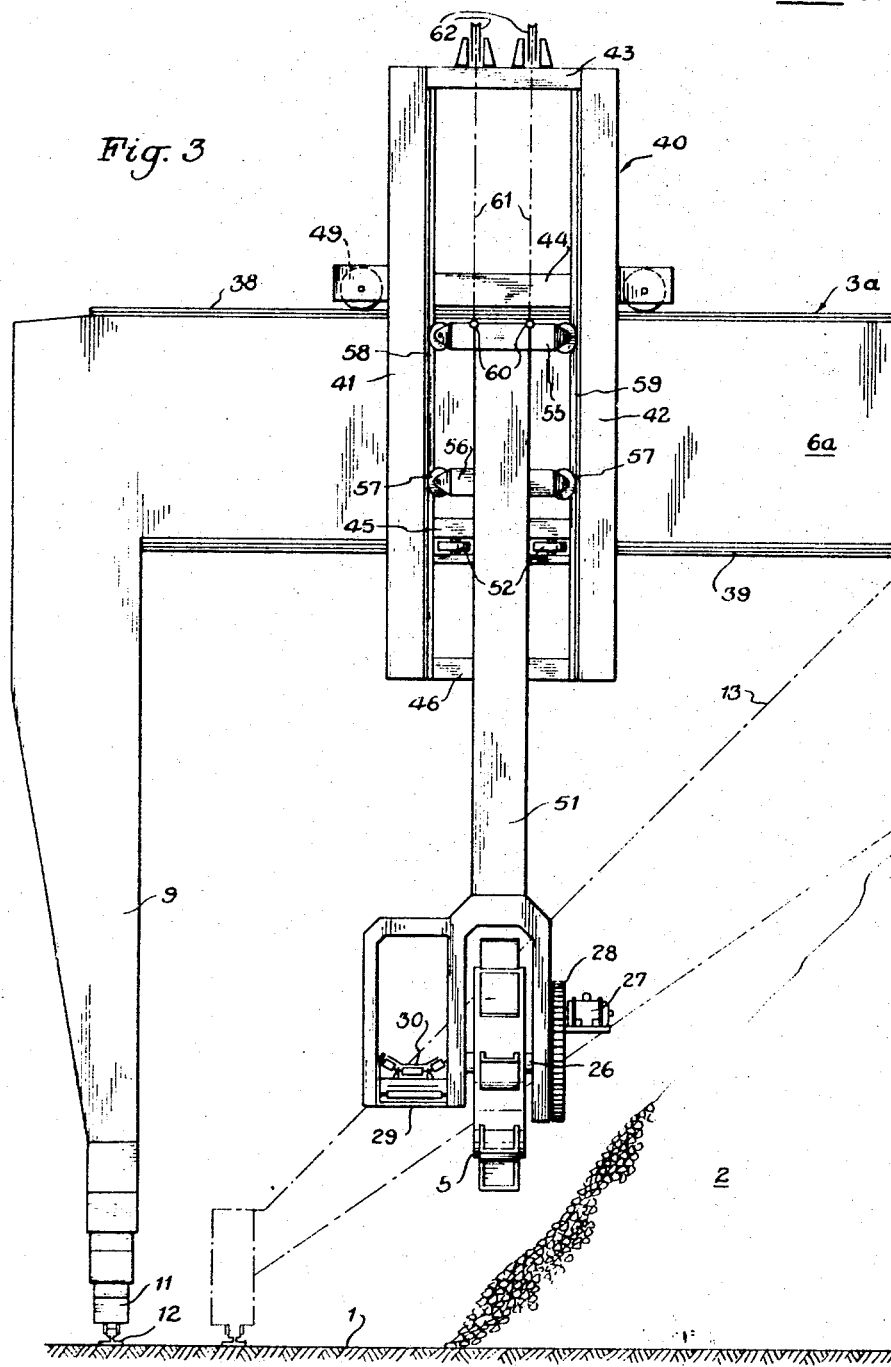

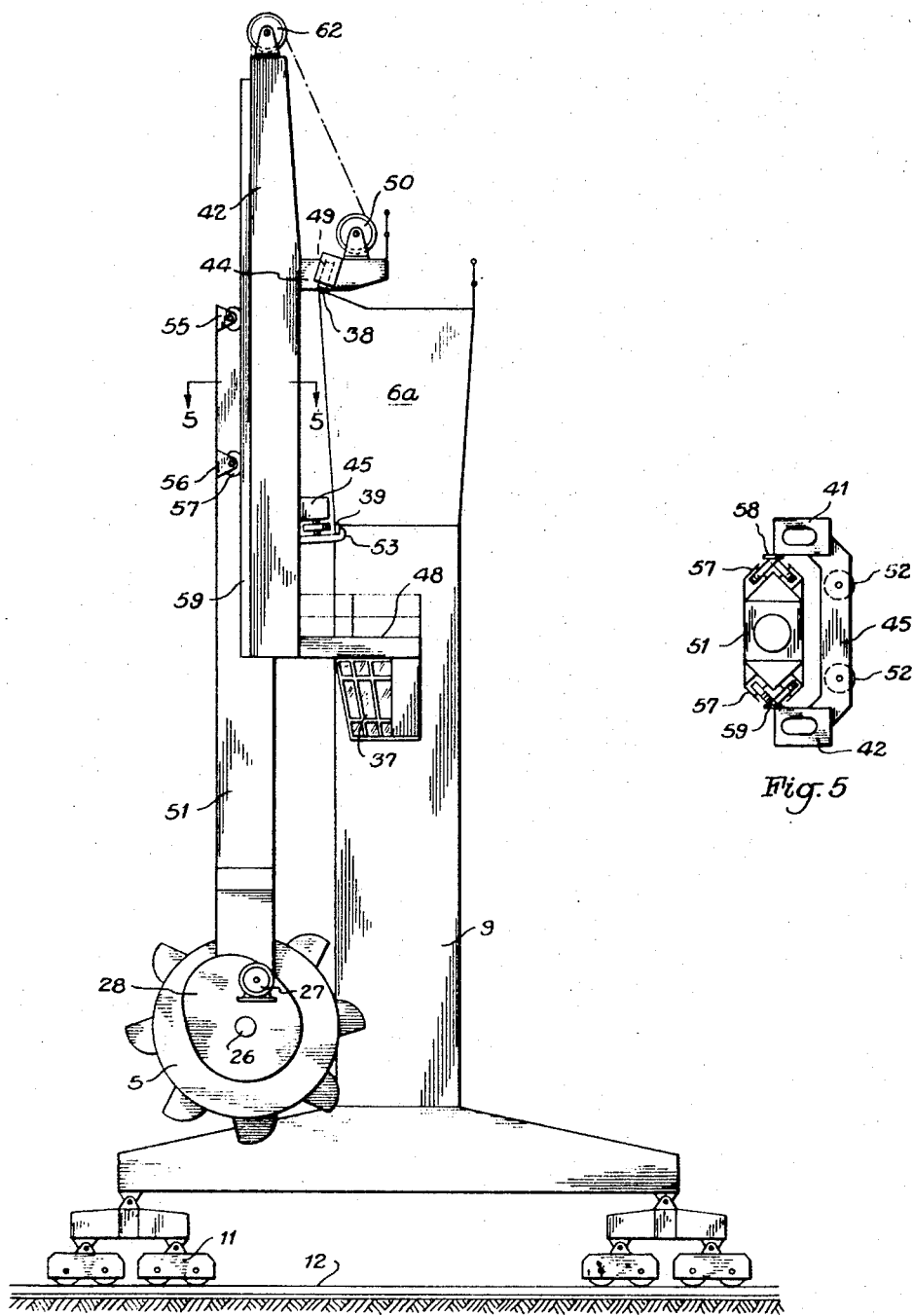

United States Patent Office 3,444,984
Patented May 20, 1969

3,444,984
APPARATUS FOR REMOVING BULK MATERIAL FROM A STOCKPILE
Heinrich Degenhardt, Nuremberg-Reichelsdorf, and Werner Quaas, Nuremberg, Germany, assignors to Maschinenfabrik Augsburg-Nürnberg Aktiengesellschaft, Nuremberg, Germany
Filed May 31, 1967, Ser. No. 642,386
Claims priority, application Germany, July 1, 1966, M 70,061
Int. Cl. B65g 65/28
U.S. Cl. 198—36                             1 Claim

ABSTRACT OF THE DISCLOSURE

Material is removable from a stockpile by a gantry spanning the stockpile and carrying a trolley from which a bucket wheel is suspended for digging the stockpile material.

This invention relates to an apparatus for removing bulk material from a stockpile and comprising a travelling gantry having a traversing trolley spanning the stockpile.

Stockpiling systems are known, especially at ocean terminals, where ship's cargo, such as bulk material, is stacked on storage areas for transshipment in due course of time by inland transport conveyances, such as railway wagons, river barges and similar craft. Recovery from the storage area may be by means of travelling gantries spanning the storage area and having on the bridge girder a traversing trolley using clamshell grabs to pick up the bulk material and take it to a storage hopper at one end of the gantry. The capacity of such conventional equipment cannot be increased sufficiently because much time is lost in moving the trolley and grab over the long distances on the recovery gantry so that, even if the trolley speed is increased, the improvement in handling capacity is marginal quite apart from the higher investment, especially in installed electrical equipment.

To improve the handling capacity of the conventional recovery gantry, a system has become known where a bucket wheel is suspended from the gantry bridge by means of a boom system to pick up the bulk material which is delivered onwards by a belt conveyor. The boom system carrying the bucket wheel to which the belt conveyor is fitted so as to be adjustable for height is suspended by means of ropes from three points of the gantry. This suspension of the boom from the gantry bridge is intended to permit the bucket wheel fitted to the boom to reach any point of the stockpile, but lowering and, especially, advancing the bucket wheel into the stockpile is difficult because as recovery progresses, the boom ropes have to be adjusted constantly. A further draw-back of the conventional system is in the fact that, especially with wide spans of the recovery bridge, the weight and the area of the bucket wheel boom system suspended in the ropes and exposed to the wind increases quite considerably while the ropes are at an ever flatter angle, which causes the rope forces to increase most uneconomically.

Compared to the prior art, this invention has for its object to provide equipment which permits continuous digging and recovery of the bulk material from the stockpile as well as a substantial increase in the handling capacity of a recovery gantry.

This object is achieved in this invention by providing the gantry with a trolley carrying a bucket wheel arranged to be lowered onto the stockpile.

The use of the bucket wheel in conjunction with the trolley greatly accelerates and simplifies recovery operations. Another advantage of this invention is in the fact that the digging and recovering operation can be automated in a straight-forward manner. Furthermore, this invention offers an advantage in that the continuous movement of the bucket wheel by the trolley along the gantry bridge permits the stockpile to be removed in steps and even layers while reducing the horsepower requirement of the drives.

According to another feature of this invention, the trolley is formed on its underside with a hinge at one side to which a boom connected with the bucket wheel is pivoted whereas, at its other side, the trolley has a platform on which a hoist for the boom is located.

A further feature of this invention provides for the trolley to have a forked mast guided on it vertically and carrying a bucket wheel at its lower end, and also a support for a conveyor associated with the bucket wheel as well as a hoist on the trolley by means of which the forked boom can be raised or lowered.

A further feature of this invention provides for the forked mast with the bucket wheel and conveyor attached to it to be revolved about its vertical axis.

The advantage of this feature is in that when operation makes this desirable the stockpile, or two adjacent stockpiles can be recovered with one and the same bucket wheel without it being necessary, when changing to recover a different type of material, to return the gantry to the starting end of the other pile to be recovered.

The means by which the objects of this invention are obtained are described more fully with reference to the accompanying schematic drawings, in which:

FIGURE 2 is an end elevational view of the installation shown in FIGURE 1;

FIGURE 3 is a front elevational view of an installation for recovering bulk material comprising a recovering gantry and carrying a traversing trolley fitted with a forked mast;

FIGURE 4 is an end elevational view of an installation according to FIGURE 3; and FIGURE 5 is a cross-sectional view through the trolley as taken on line 5—5 in FIGURE 4.

Figure 1:
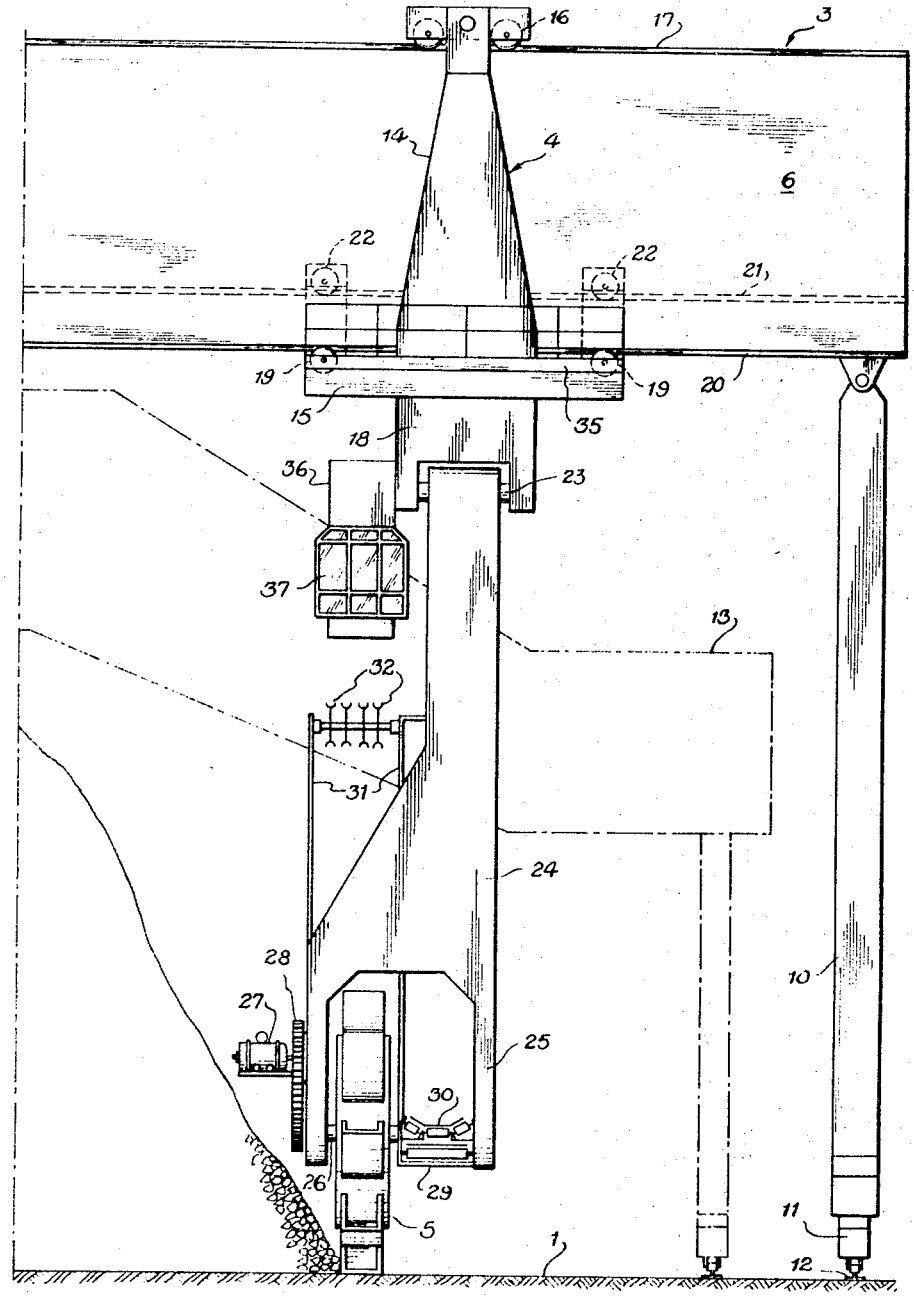
FIGURE 1 is a front elevational view of an installation for recovering bulk material comprising a recovering gantry carrying a traversing trolley.

The installation for recovering bulk material according to the embodiment shown in FIGURES 1 and 2 consists essentially of a recovery gantry 3 spanning a storage area 1 for bulk material or a stockpile 2, respectively, and a trolley 4 carrying a recovering device with a bucket wheel 5 traversing on it. The gantry 3 has a bridge girder 6 consisting of a large box girder 7 and a small box girder 8 attached to one side at the bottom. The bridge girder 6 has its ends mounted on legs 9, 10. The legs are carried on driving trucks 11 which run on rails 12 located at both sides of the stockpile 2 on the storage area 1. The height of the legs 9 and 10 is proportioned so that the gantry 3 readily clears both the stockpile 2 and a stockpile filling gantry 13 which may also straddle the stockpile, when travelling in either direction. The trolley 4 is of the "angle" type, being formed by a vertical member 14 and a horizontal member 15. The vertical member 14 is provided on its top with a truck 16 running on a rail 17 which is laid on the top edge of the large box girder 7. The lower end of the vertical member 14 is connected to the horizontal member 15 which at its one end carries a box-shaped member 18. Near the member 18, there are two carrying wheels 19 and backing wheels 22 which bear against rails 20, 21 laid on the small box girder 8. Horizontal forces due to the bucket wheel 5 and acting in the direction of the gantry travel are taken up by the flanges of the carrying and backing wheels, or horizontal rollers, which are not specifically shown, can be provided. Below the carrying wheels 19, there is a hinge 23 on the member 18 to which is pivoted a boom 24 for the bucket wheel 5. The boom 24 is fork-shaped at its lower end. In the fork 25 of the boom 24, there is a shaft 26 for the bucket wheel 5 which is driven by a motor 27 via a reduction gear 28. Also provided in the fork 25 is a support 29 for a belt conveyor 30 which is carried by a hoist arranged on a platform at the side of the operator's cab 37, this hoist being not specifically shown. Attached to the boom 24 is also a supporting frame 31 for several rope sheaves 32 which, via ropes 33, are connected with a hoist 34. The hoist 34 is mounted on a platform 35 which is attached to the lower end of the vertical member 14. Furthermore, there is a supporting arm 36 fitted to the member 18 to support the operator's cab 37.

According to the second embodiment illustrated in FIGURES 3 to 5, the recovery gantry 3a, whose bridge girder 6a is formed in the shape of a trapezoidal box section, carries a trolley 40 which is guided by two rails 38, 39 on the bridge girder 6a. The structure of this trolley 40 is formed by two vertical members 41, 42 which are connected by several horizontal ties 43 to 46. The vertical members 41, 42 and the cross ties 43 to 46 are in the form of box girders. The two cross ties 44 and 46 are formed integrally with the platform 47, 48, the lower platform 48 supporting an operator's cab 37 and the upper platform 47 a traversing mechanism 49 for the trolley 40 and a hoist 50 for a fork boom 51 connected with the bucket wheel 5. Another cross tie 45 which also takes the form of a platform has two supporting wheels 52 attached to it which bear against a rail 39 fitted to the bridge girder 6a. In order to prevent the supporting wheels 52 being lifted off the rail 39 when the bucket wheel 5 is subjected to an impact there is a safety hook 53 provided near each supporting wheel 52, one safety hook being provided for each wheel and connected to the cross tie. The forked boom 51 is supported in the cross heads 55, 56 and provision is made for the mast to be revolved about its vertical axis by means of a drive mounted on one of the crossheads. This drive is not specifically shown in the drawing. For guidance of the forked boom 51, the crossheads 55, 56 are provided with wheels 57 at their ends. The wheels 57 are located at an angle at the ends of each crosshead 55, 56 in a manner that the two wheels at each side run on a common rail 58, 59 connected to the respective vertical member 41, 42. Provided on the upper crosshead 55 are anchorages 60 and, at the topmost cross tie 43, deflection sheaves 62 for the hoist ropes 61 of the forked mast 51. The lower end of the forked boom 51 carries the bucket wheel 5, a drive motor 27 with reduction gear 28 for this bucket wheel and a support 29 for a conveyor 30.

The operation of the apparatus according to the above-described embodiments is as follows:

On putting the apparatus into operation, the trolley 4 or 40, respectively, is moved over the stockpile 2 and the bucket wheel 5 fitted to the boom 24 or forked boom 51, respectively, is lowered onto the stockpile 2 until it can conveniently pick up the material and deliver it to the conveyor 30. Subsequently, the trolley 4 or 40, respectively, is traversed along the bridge girder 6 or 6a, respectively. By traversing the trolley, layers of the bulk material is recovered from the stockpile 2. Upon the edge of the stockpile 2 being reached, the direction of trolley movement is reversed and a new cut started. On completion of recovering operations, or when the apparatus is shut down, the trolley 4 or 40, respectively, is moved to the end of the bridge girder 6 or 6a and the bucket wheel 5 raised up to the level of the operator's cab 37. In the retracted condition, the bucket wheel 5 is flush with the lower edge of the operator's cab 37. In this position, it conveniently clears the stockpile filling gantry 13 underneath.

Having now described the means by which the objects of this invention are obtained,

We claim:

1. Apparatus for recovering bulk material from a stockpile in a storage area comprising a gantry spanning the stockpile and movable over it, a traversing trolley (4) movably carried by said gantry, a boom (24) hinged to the bottom of said trolley on one side thereof, a forked lower end on said boom, a bucket wheel (5) mounted in said lower end, conveyor means (30) mounted in said forked lower end for receiving stockpile material from said bucket wheel, a platform (35) connected to the other side of said trolley, and a boom hoist (34) mounted on said platform and connected to said boom for moving said bucket wheel into the stockpile material.

References Cited

UNITED STATES PATENTS

| 677,718 | 7/1901 | Titcomb | 212—14 X |
| 1,230,236 | 6/1917 | Stuart | 214—10 |
| 3,225,943 | 12/1965 | Sasadi | 214—10 |
| 3,306,476 | 2/1967 | McMillan | 214—10 |

FOREIGN PATENTS 585,413  9/1933  Germany.

GERALD M. FORLENZA, Primary Examiner.

F. E. WERNER, Assistant Examiner.

U.S. Cl. X.R.

214—10